Sept. 7, 1937.　　　N. M. HOPKINS　　　2,092,119
ASSEMBLY VOTING SYSTEM
Original Filed March 10, 1931　　4 Sheets-Sheet 1
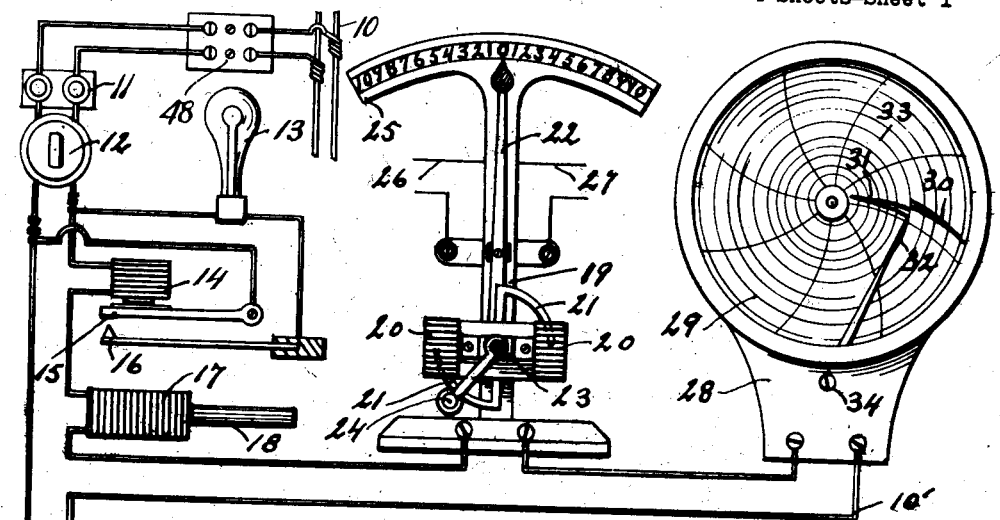
FIG. 1.
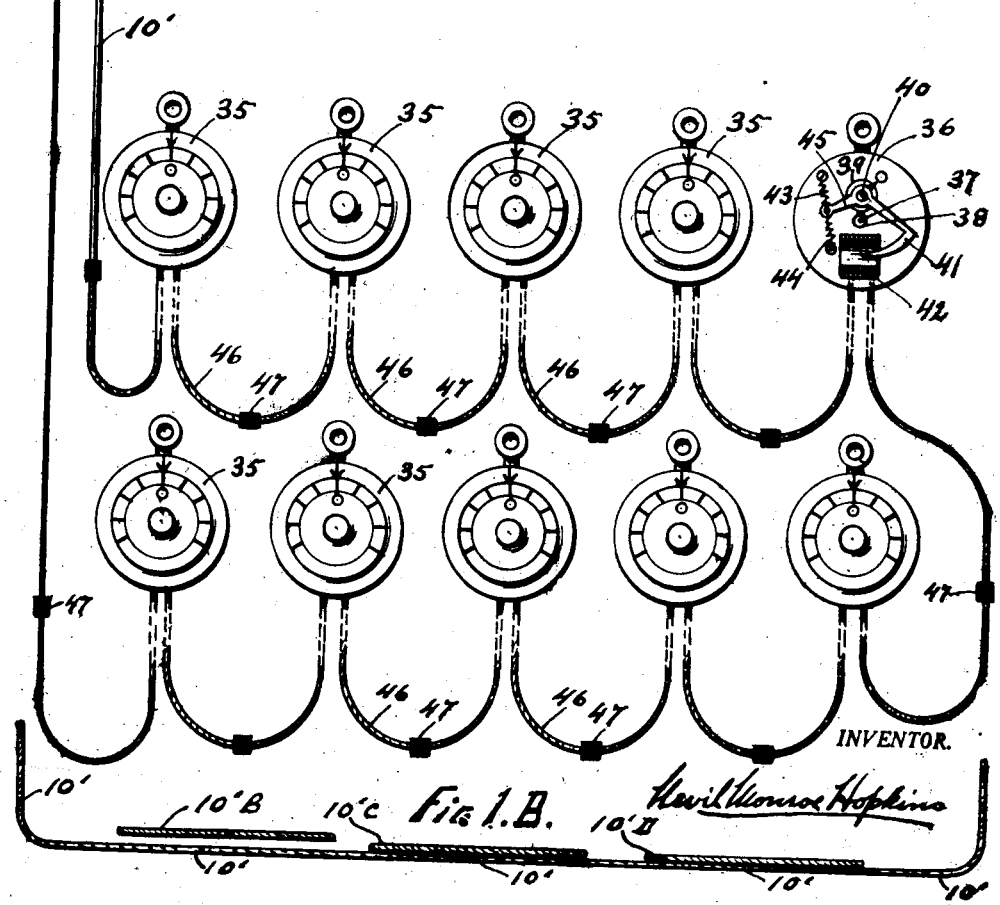
FIG. 1.B.
INVENTOR.
Nevil Monroe Hopkins Sept. 7, 1937.  N. M. HOPKINS  2,092,119
ASSEMBLY VOTING SYSTEM
Original Filed March 10, 1931   4 Sheets-Sheet 2

INVENTOR.

Sept. 7, 1937.  N. M. HOPKINS  2,092,119
ASSEMBLY VOTING SYSTEM
Original Filed March 10, 1931   4 Sheets-Sheet 4
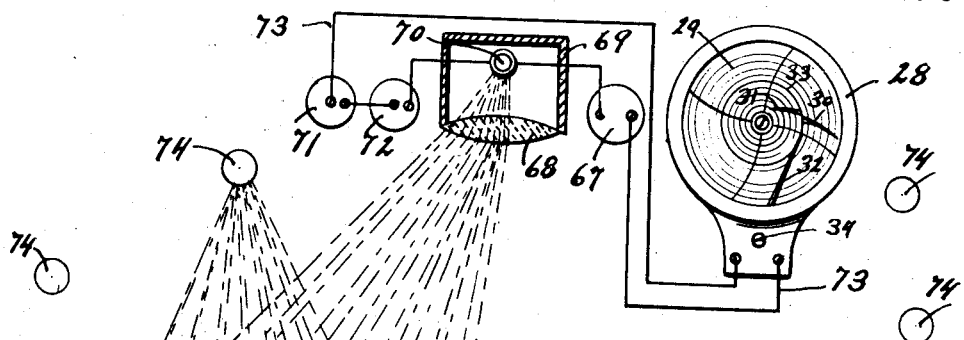
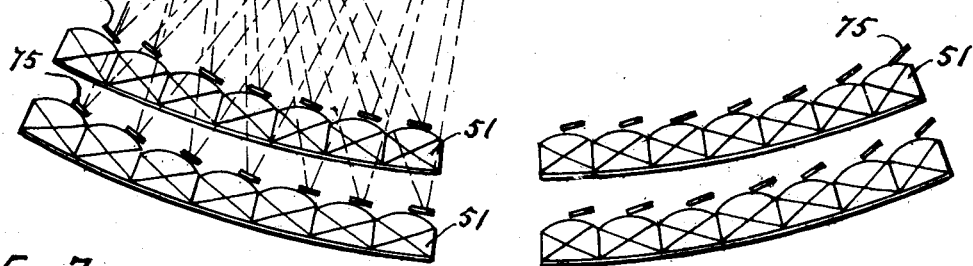
Fig. 6.
Fig. 7.
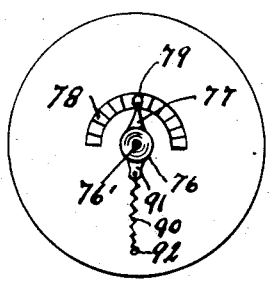 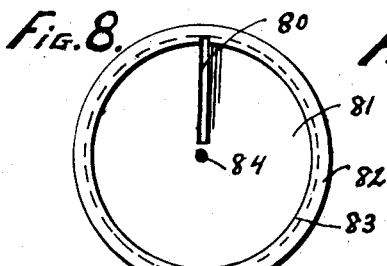 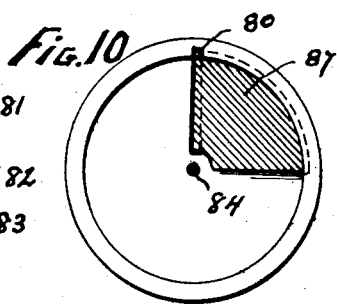
Fig. 8.  Fig. 10.
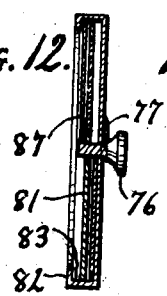 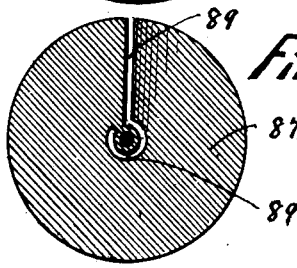 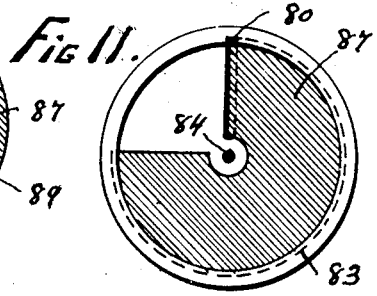
Fig. 12.  Fig. 9.  Fig. 11.
INVENTOR.
Nevil Monroe Hopkins Patented Sept. 7, 1937

2,092,119

UNITED STATES PATENT OFFICE 2,092,119

ASSEMBLY VOTING SYSTEM

Nevil Monroe Hopkins, New York, N. Y.

Application March 10, 1931, Serial No. 521,419
Renewed July 6, 1934

13 Claims. (Cl. 235—52)

This invention relates to a system of voting applicable to audiences of variable population, and has for its object to provide a method of and apparatus for voting which will be simple in operation, more efficient in manipulation, and less costly of manufacture and installation than those heretofore proposed.

With these and other objects in view the invention resides in the novel steps and combinations of steps constituting the method, as well as in the novel details of construction and arrangements of parts constituting the apparatus, as will be disclosed more fully hereinafter and particularly pointed out in the claims.

Referring to the drawings forming a part of this specification in which like numerals designate like parts in all the views,—

Fig. 1 is a wiring diagram of one modification of the invention wherein the voting stations are connected in series;

Fig. 1B is a detail illustrating a modified form of voting station;

Figure 2:
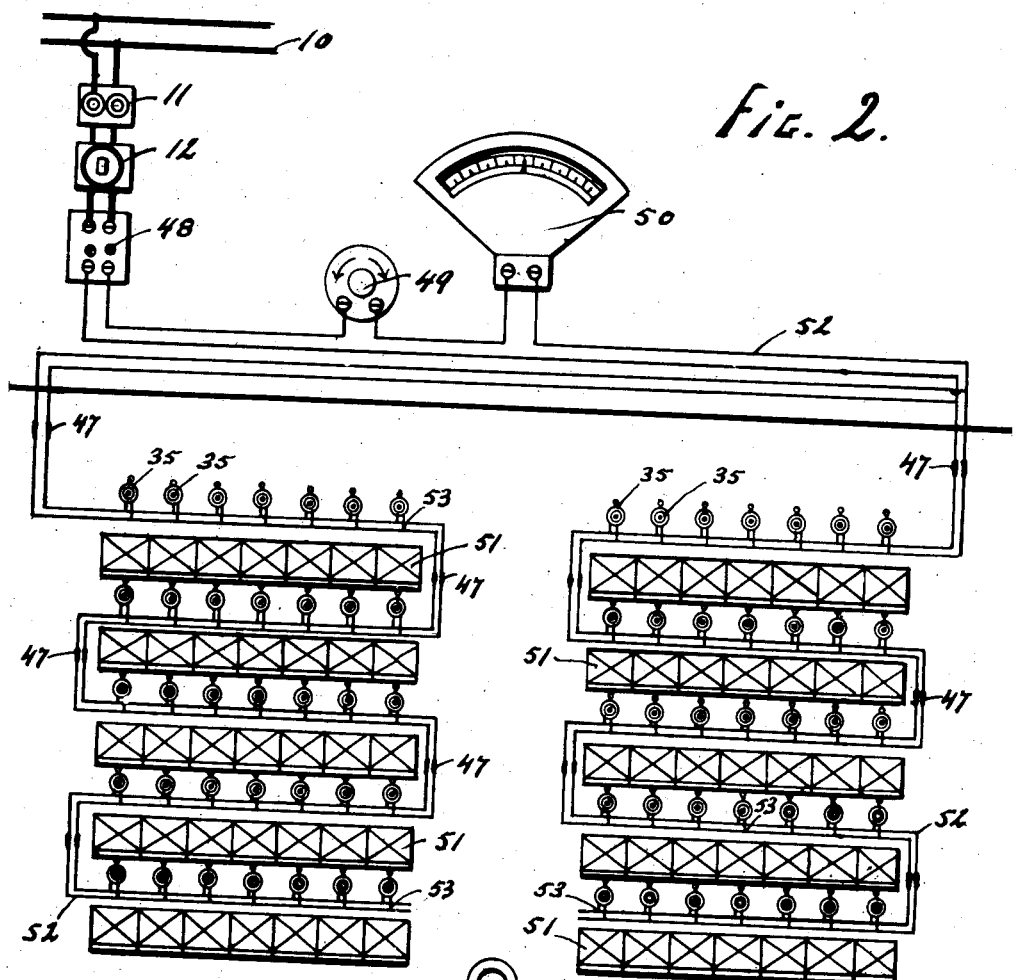
Fig. 2 is a wiring diagram of another modification wherein the stations are connected in parallel.

Fig. 6 is a diagrammatic view showing application of the invention to a portion of an auditorium, wherein the system is broadly referred to as being wireless with respect to the voting stations, and yet of a nature permitting quantitative and substantially simultaneous indication of the total percentage vote upon a suitable electrically controlled device; and Figs. 7 to 12 inclusive are views illustrating details of construction of the device held in the hand of a voter for use in casting his vote in the system shown in Fig. 6.

Referring to Fig. 1, where I deal with a series connected electrical wired system, I start by using the continuous energy of, let us say, an alternating current of 110 volts, 60 cycles. Where only direct current is available, I install a small portable motor-generator, with the generator designed for 110 volts and 60 cycles. 10 are the alternating current main line electrical conductors, 11 is a protecting fuse block, 12 a cutoff switch, 13 a red incandescent lamp adapted to light up when, as and if the electrical circuits of my apparatus should be broken because the electro-magnet 14 would release the drop bar 15, contacting with the member 16, and thereby complete the circuit through the red pilot lamp. Here 17 is a solenoid choke coil of insulated wire and 18 a movable iron core, furnishing adjusting means for my system.

19 is an electrical indicator comprising the solenoid magnets 20 adapted to attract the iron tongues 21, adapted in turn to cause rotation of the pointer 22 about its pivot 23. The counterweight 24 is a very important member of this system indicator since it brings the pointer 22 to the left hand, or minus end of the scale 25 when the electric current, passing through the solenoids of the instrument, decreases. 26 and 27 are local circuits leading to cells of batteries and bells of different tones, to ring a "no" or a "yes" alarm when the system is operated in the dark. 28 is a recording instrument connected in series with the paper chart 29 driven by clock-work, or a small synchronous clock motor. Here 30 is a line on the chart representing a 100% "yes" recorded vote, and 31 is a similar line representing a 100% "no" recorded vote, both lines having been made by the pointer-marker 32 which is illustrated as resting on the zero or neutral line 33 of the chart. 34 is the instrument adjusting screw by which the pointer may be brought to the zero line.

35 represents the casings of a design of my hand dial reactors shown with the dials all at zero, opposite the arrows under the little suspension rings. 36 is the back plate of one of my hand dial reactors with the front of the casing and dial removed. Here 37 is the dial spindle actuated by a knob mounted exteriorly of the casing and adapted to revolve the small gear 38. No teeth are here shown because of the impracticability of drawing gear teeth so small. This small gear engages the teeth of the larger gear 39 on the spindle 40 adapted to turn the iron tongue inductor member 41 in and out of the solenoid coil of insulated wire 42. The little spiral springs 43 and 44 are fashioned and adjusted to always bring the dial plate of the inductor to zero through the agency of the lever arm 45 when no vote is being made. When the dial plate of the inductor is at zero, the iron tongue inductor member 41 is partially in the solenoid 42 as shown, which is adjusted as to iron mass, thickness and form, as to give a 50% electro-magnetic value to the inductor. In other words, electro-magnetically speaking, the inductor is now half in and half out.

46 represents stranded flexible insulated conductors adapted to be quickly coupled mechanically and electrically through the agency of the insulating connectors 47. The parts 35 to 46 inclusive constitute generally what I term the individual voting station. Current from the main line will thus be seen to flow to and through the inductor and recording devices by virtue of the series connected wire 10', and the amount of flow flexibly controlled by the solenoid 17 with its movable core 18, as well as by the individual voting stations.

With reference to Fig. 1B, 10' is a bare portion of the series conductor wire or cable above described, and 10'B is a length of a bare metallic conductor previously supplied to each individual of an audience, said length shown out of contact with said cable 10', as, for example, being simply held in the hand of an individual. At 10'C and at 10'D, however, the short lengths of other bare, free conductors belonging to other individuals, are shown as brought into electrical contact throughout their lengths, with the bare portions of the cable 10' thereby furnishing a parallel flow circuit and consequently reducing the electrical resistance thereof in simulation of the hereinbefore mentioned modes of voting. There are many ways of conveniently adding or deducting these auxiliary short lengths of conductors by the members of an audience and it is not deemed necessary to expand in detail here upon elaborations which will be obvious to any qualified electrician.

Coming now to Fig. 2, 10 is again the source of 60 cycle alternating current, 11 the fuse protection, 12 the cut off switch, and 48 is a small transformer for stepping down a 110 or 220 volt alternating current to 10 or 20 volts for example; it is perfectly obvious that a similar transformer may be incorporated in the circuit shown in Figure 1. I prefer to especially use a transformer with a plurality of taps to its low voltage winding, enabling me to adapt the voltage impressed upon my system to the size of any hall and consequently to the number of hand inductors used by the audience therein. This voltage and current adjustment is important in order to secure maximum swings of my instrument pointer, and to secure substantially the same quantitative swing regardless of the number of persons present in an assembly for voting purposes. In addition to the transformer taps, I also install a variable reactor or electrical resistance apparatus 49 in series with the electrical indicator 50. Here the plurality of dial hand inductors 35, are shown connected in parallel, the two-conductor flexible insulated cable being here illustrated simply by two wires carried back and forth in front of the seats 51 in a hall where the system has been quickly and temporarily installed.

Figure 3:
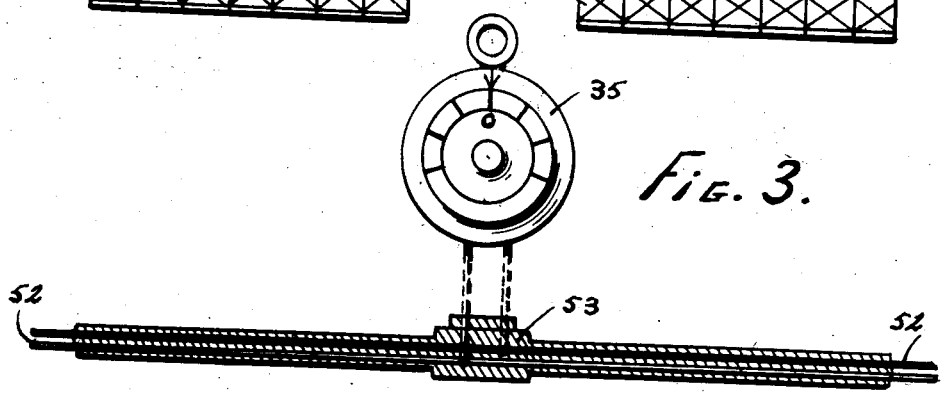
Fig. 3 is an illustration, more in detail, of one of the voting stations shown in Fig. 2.

It is to be particularly observed that, according to this system, the voting stations are all connected in parallel with the main source of current, the indicator 50 being series connected to show the total load thrown upon the line upon operation of the voting stations. In Fig. 3 there is shown an enlarged front view of one of my dial hand inductors connected in parallel or multiple with the conductors 52 at the multiple plug connector element 53, and in practice, I elect to space these plug connectors substantially the width of a chair, and to fashion them neatly of the smallest size consistent with the light duty they have to meet.

Figure 4:
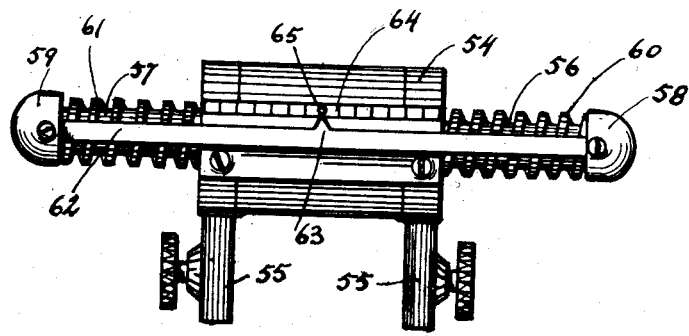
Figs. 4 and 5 are respectively detailed views in elevation and section of another modified form of voting station.
Figure 5:
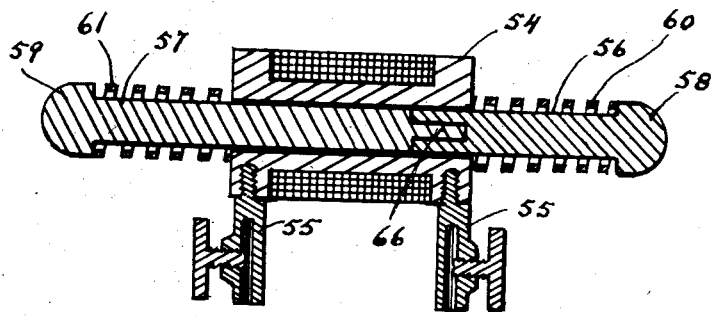

In Figs. 4 and 5 there is illustrated a modified form of hand inductor, where 54 is an insulating spool wound with insulated wire whose ends terminate at the connectors 55, and a soft iron inductor member 56, passing a part way into the interior of the spool solenoid 54, is joined as at 66 to a non-magnetic rod 57 which may be of brass. The rods 56 and 57 terminate in the knobs 58 and 59 adapted to fit the palm of the hand when the rods are pushed back and forth through the spool solenoid against the tension of the spiral springs 60 and 61.

A flat bar member 62 carries a central pointer member 63 which passes over the scale member 64, from right to left or from left to right, with a central zero mark 65. When the hand inductor is not pressed either way by the palm of the operator, the tension of the two adjusted springs 60 and 61 keeps the pointer at the zero or central position as shown, and in this position, the hand inductor is electro-magnetically speaking, substantially half in and half out.

In Fig. 6 there is illustrated a system which departs from the foregoing in that it provides no wired electrical device personally controlled by the voter, but discloses a system wherein radiant energy, as light or heat waves, is utilized in affecting an electrical circuit containing an indicating device as well as an energy responsive element influenced by the voters. According to this system, 51 represents the chairs or seats in an auditorium, 28 the indicating device or recorder preferably in full view of the audience, and 67 a special calibrating and control apparatus. 68 is a wide angle lens in the forward open end of a housing or camera 69, 70 is a light sensitive and/or heat sensitive device, a selenium cell for example, and 71 and 72 are cells of a battery connected serially by conductors 73 in the system. 74 is a source of light and radiant heat, which may be of special character and location, or merely the footlights or other lights of the hall for reflecting light and/or radiant heat into the wide angle lens 68, to a greater or lesser extent, depending upon the adjustment of the hand devices 75 by the voting individuals.

Fig. 7 is a back view of one of the individual hand devices 75 with the finger and thumb knob 76 adapted to be turned to the left or right upon the shaft 76, sweeping the pointer 77 over the graduated scale 78. The zero or neutral position of the pointer is here shown at 79, and 90 is a spiral spring under tension, anchored at one end to the stud 92, and at the other end to the lever 91, carried by the pointer 77, for insuring a "neutral position" of said pointer when no vote is being cast.

A front view of this hand device with its movable vane member absent, is shown in Fig. 8, there being provided simply a vertical open slot 80 in the disk or plate member 81 which latter may be of polished sheet nickel, or be of sheet metal covered with a disc of white cardboard, depending upon conditions, 82 being a raised rim member, undercut as indicated by the dotted lines 83. 84 is a central opening for the shaft of the finger and thumb knob shown in Fig. 7, and which is adapted to revolve a movable vane member 87 of blackened metal shown in Fig. 9, said member having a radial slit 89 the inner end of which terminates in a circular slit concentric with the shaft 76 as clearly shown, thus enabling the insertion of said member from the back of the disc 81 through the slot 80 with its periphery enclosed by the under-cut rim 82, for rotation therein. In Fig. 10 this black vane member 87 is shown one-quarter out of the slot 80, and in Fig. 11 it is shown three-quarters exposed.

In operation, the individuals comprising a voting group, have but to hold their hand devices toward the lens of the camera and to turn in or out the blackened vane member by means of the knob at the back of the device. The more of the nickel disc or the white cardboard exposed, the greater will be the reflections back of light and heat to the lens, and its light and heat sensitive device and, therefore, the greater will be the deflection of the electrical indicator and recorder. Conversely by "turning in" more of the blackened vane member, the less will be the reflection to the lens of light and heat rays and the less will be the deflection of the electrical indicator. It will be appreciated that the normal or natural light reflecting and heat radiation power of the audience will be ascertained in advance of the voting, and taken into consideration in the percentage computation of voters present whereby there may be secured very excellent quantitative and time saving simultaneous indications or records of favor or disfavor of any proposition put before the audience. In other words, one audience differs from another in light reflecting and heat radiating power dependent upon the character of their clothing, body temperature, etc. and in order to establish a basic zero reading of the audience before the vote is taken, it is necessary to calibrate the light reflecting and heat radiating power of said audience.

Whereas I have shown a selenium cell system, I may use one or more photo-electric cells, or a battery of such cells with their proper amplifiers, batteries, galvanometers, etc., or I may employ a sensitive thermo-pile, or a battery of thermo-piles and connect them up to a galvanometer for either indications upon an illuminated scale or graph record.

Whereas, I have shown only a very simple diagram in connection with a small audience and a small hall, I wish it to be understood that in a large theater with a gallery, for example, or at certain other large places for large assemblies, as at public luncheons or dinners, where it would be impracticable for each individual present to point or direct his or her hand voting device toward a single or common light or heat sensitive recording system, that I would have a plurality of light or/and heat sensitive systems located in different parts of the theater or other assembly place, and connect all these light or/and heat sensitive devices together in proper manner so as to secure an additive effect and thereby obtain the sum total expression of a widely scattered number of persons voting.

I have found in connection with my series connected wired voting system, that I can secure additive expressions of favor from a group of assembled persons, by causing the closed circuit uninsulated conductor to merely pass through their hands, securing a quantitative swing of the electrical indicating instrument in series, due to the temperature coefficient of the metal of the conductor, and the warming up of the conductors when firmly held by the fingers of the hands of the assembled persons.

The electrical resistance of metals, in general, changes with change in temperature and I have secured excellent results in my system, using both iron and copper conductors. In this case, the indicating instrument swings backward, but obviously for this system it may be so constructed as to apparently swing forward and show apparently higher and higher indications as more of the voting individuals in the voting assembly grasp and firmly press the conductor as they may be instructed to do when, as and if they desire to cast a vote.

It will be furthermore appreciated, by those skilled in the arts and sciences with which my inventions have to deal, that I have made disclosures for, and laid the broad foundation for, a novel flexible assembly voting system readily adaptable for audiences of variable population such, for example, as found today in moving picture theaters. This invention further contemplates a system with or without wires, cheap, as to cost, easy of installation and dismantling, accurate; a system for quantitative or graduate voting, as well as for obtaining a simple "yes" or "no" vote and, moreover, practically secret in repeat manipulation so far as one's neighbor in the next seat is concerned; and lastly a system of continuous operation with any sized audience.

From the foregoing description, it will therefore be seen that there are disclosed two broad systems, one wherein the individuals of the audience actually and positively manipulate devices which change the value of the impedance or the resistance of an electric circuit, this system being referred to as wired; and the second system wherein the individuals of the audience do not actually manipulate devices electrically connected in circuit to change the impedance or the resistance of that circuit but, on the other hand, manipulate devices which affect radiant energy transmitted to a sensitive energy responsive element for producing a result somewhat similar to that produced by said first mentioned system, and this second system is referred to as wireless. However, the same principle of operation is employed in both of these broadly stated systems.

In other words, in the operation of taking votes according to either of these systems, the audience is instructed to operate to the full limit in the same direction (right or left) their individual voting station (represented by the numeral 35 or 54) in the wired system, and to present to the source of light 74 the fully exposed light reflecting disk shown in Figs. 7 to 12 inclusive in the wireless system, before the actual vote is taken. The purpose of these manipulations is to enable the operator of the system to adjust the impedance or the resistance of said system with respect to that particular audience, whereby the pointer on the indicator device may be brought to a full scale reading representative of 100%. This, it will be seen, is the equivalent of establishing, on the indicating device, a reading equivalent to the percentage vote of the audience when all members thereof simultaneously and unanimously cast a vote.

Then the question is put to the audience upon which a vote is desired and, at the instant specified, all of the audience casts its vote. In the case of the device 35 shown in Fig. 1 the "yes" and "no" votes are preferably made independently. In making the "yes" vote the knob of the device will be turned say to the right whereas for the "no" vote it will be turned in the opposite direction. The device 35 is so constructed that, when no vote is being taken, the tongue 41 is only part way within the coil 42, but when a "yes" vote is to be made the correct turning of the knob will cause this tongue to pass out of the coil thereby reducing the amount of impedance in the indicator circuit. On the contrary, when a "no" vote is to be made the opposite turning of the knob will cause said tongue to enter further into said coil and thereupon increase said impedance. Thus, if only the collective "yes" votes are made, the indicator arm 22 will move say to the right and give a correct percentage vote; and if only the collective "no" votes are made, said arm will move to the left and likewise give a correct percentage vote because the scale 25 is calibrated equally to both sides of the central zero indication. By this manner of voting the difference must be calculated between the "yes" and the "no" percentage readings. Obviously, however, if the scale reading was in accordance with the actual number of voters, the "yes" and "no" votes could be simultaneously made in which case the arm 22 would ultimately come to rest at a scale reading truly indicative of the preponderance of the vote cast. Also, it will be apparent that the same manner of voting may be accomplished with the device 54 shown in Figs. 4 and 5.

In the case of the disk device shown in Figs. 7 to 12 the "yes" and "no" votes may be taken either simultaneously or independently, since the device is reflective only when the face 81 is exposed but on behalf of secrecy the simultaneous vote is to be preferred. That is to say those in favor of the question will vote by holding up the device with the uncovered reflective face 81 presented to the source of light 74 thereby causing the indicating instrument to be moved in accordance with the change in resistance created by the reflected light. Those opposed to the question will turn the knob 76 to cause the blackened vane 87 to cover the reflector face 81 of their devices and similarly present said devices to said light source, but the devices of the opposing voters will cause no change of resistance in the indicator circuit. Obviously for a "no" vote the devices could be kept down or not presented to the light source, but this would make it possible for members of the audience to readily ascertain how his neighbor voted and therefore have the disadvantage of being non-secret.

Therefore it will be understood that all those desiring to vote "yes" on that question would manipulate their hand devices (voting stations) to throw into the main circuit a resistance which, as based upon the adjusted 100% indicator reading, will give a new reading truly indicative of the percentage of the audience that has just voted "yes". This will be done substantially simultaneously and, since the indicator device is made extremely large and put in full view of the audience, the audience will be keenly interested in watching the pointer move up to the scale reading denoting the true percentage of the vote cast.

It is obvious that those skilled in the art may vary the details of construction and arrangements of parts constituting the apparatus as well as vary the steps and combinations of steps constituting the method without departing from the spirit of this invention, and therefore it is not desired to be limited to the foregoing disclosures and description except as may be demanded by the claims.

What is claimed is:—

1. In a voting system the combination of an electrical indicator; means associated therewith for adjusting the scale reading of said indicator in accordance with the total number of individuals in an audience desiring to vote; a circuit including a source of energy, said indicator and said means; and means controlled by the individuals of the audience for changing the amount of current flow in said circuit in a manner representative of the vote cast.

2. In a voting system the combination of an electrical indicator; master means associated therewith for adjusting the scale reading of said indicator in accordance with the total number of individuals in an audience desiring to vote; a circuit including a source of energy, said indicator and said master means; and secondary means controlled by the individuals of the audience for changing the amount of power in said circuit in a manner representative of the vote cast.

3. A voting system comprising a circuit including an electrical indicator having a pointer and a scale; a source of power for said circuit; master means for establishing a resistance in said circuit to meet a maximum predetermined condition; and secondary means under the control of the voters to change said established resistance to meet a fractional condition to be determined and shown by said indicator.

4. A voting system comprising a circuit including an electrical indicator having a pointer and a scale; a source of power for said circuit; master means for changing the amount of power in said circuit to meet a maximum predetermined condition; and secondary means under the control of the voters to change said power to meet a fractional condition to be determined and shown by said indicator.

5. A voting system for an audience comprising a circuit including an electrical indicator having a pointer and a scale; a source of power for said circuit; master means for establishing a resistance in said circuit to meet a maximum condition of an audience of unknown numbers; and secondary means under the control of the voters to change said established resistance to meet the fractional condition representative of the percentage vote of said audience, said percentage indication immediately shown by said indicator.

6. In a voting system the combination of an electrical indicator; means associated therewith for adjusting the scale reading of said indicator in accordance with the total number of individuals in an audience desiring to vote; a normally closed circuit including a source of energy, said indicator and said means; and inductive means controlled by the individuals of the audience for changing the impedance of said circuit in a manner representative of the vote cast.

7. In a voting system the combination of an electrical indicator; means associated therewith for adjusting the scale reading of said indicator in accordance with the total number of individuals in an audience desiring to vote; a normally closed circuit including a source of energy, said indicator and said means; and means comprising a solenoid controlled by each of the individuals of the audience for changing the impedance of said circuit in a manner representative of the vote cast.

8. In an electrical voting system comprising a circuit including a device for indicating the amount of current flow in said circuit, a radiant energy sensitive element in said circuit to generate a current flow, and means under the control of each voter to vary the amount of energy reaching said element for varying the amount of said current flow.

9. In an electrical voting system comprising a circuit including a device for indicating the amount of current flow in said circuit, a radiant energy sensitive element in said circuit to alter a current flow, and means under the control of each voter to vary the amount of energy reaching said element for varying the amount of said current flow.

10. In a voting system the combination of an electrical indicator; means associated therewith for adjusting the scale reading of said indicator in accordance with the total number of individuals in an audience desiring to vote; a circuit including a source of energy, said indicator, said means, and a radiant energy sensitive element to control the amount of current flow in said circuit; and means controlled by the individuals of the audience for changing the amount of radiant energy reaching said element for varying the amount of said current flow in a manner representative of the vote cast.

11. In a voting system the combination of an electrical indicator; means associated therewith for adjusting the scale reading of said indicator in accordance with the total number of individuals in an audience desiring to vote; a circuit including a source of energy, said indicator, said means, and a radiant energy sensitive element to control the amount of current flow in said circuit; and means outside of said circuit and controlled by the individuals of the audience for changing the amount of radiant energy reaching said element for varying the amount of said current flow in a manner representative of the vote cast.

12. In a voting system the combination of an electrical indicator; means associated therewith for adjusting the scale reading of said indicator in accordance with the total number of individuals in an audience desiring to vote; a circuit including a source of energy, said indicator, said means, and a radiant energy sensitive element to control the amount of current flow in said circuit; and reflecting means controlled by the individuals of the audience for changing the amount of radiant energy reaching said element for varying the amount of said current flow in a manner representative of the vote cast.

13. In a voting system the combination of a circuit including the leads of an alternating current of 60 cycles; an electrical indicator in said circuit provided with a pointer adapted to move in opposite directions; and voting devices connected in said circuit and normally placing a certain load in the circuit which may be increased or diminished variably in positive and negative voting, the cumulative effect of load variations of the individual devices causing a displacement of the pointer in either direction from normal, said devices including inductive means of equal maximum value controlled by the individual voters for changing the impedance of the current in said circuit, said change being registrable on said indicator.

NEVIL MONROE HOPKINS.